Figure 1:
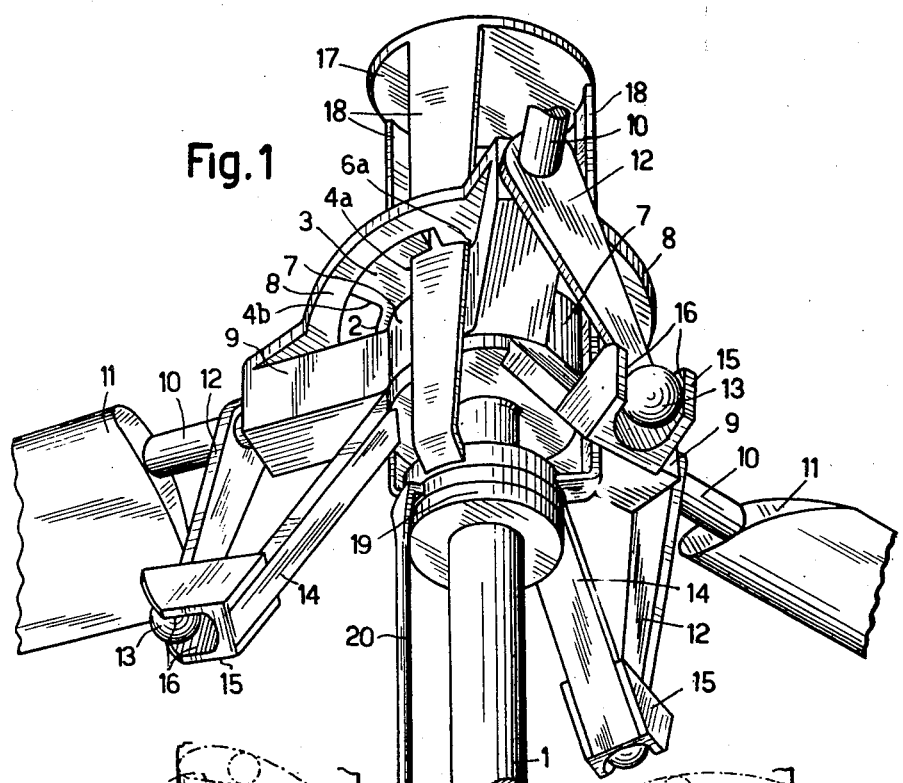

June 30, 1953 — A. MUTHER — 2,643,726
EMERGENCY LANDING PITCH CONTROL MEANS ON A HELICOPTER ROTOR
Filed Feb. 7, 1950

INVENTOR:
Adolf Muther
by Sommers & Young
Attorneys

Patented June 30, 1953

2,643,726

UNITED STATES PATENT OFFICE 2,643,726

EMERGENCY LANDING PITCH CONTROL MEANS ON A HELICOPTER ROTOR

Adolf Muther, Zurich, Switzerland

Application February 7, 1950, Serial No. 142,909
In Switzerland January 7, 1950

4 Claims. (Cl. 170—160.46)

This invention relates to blade positioning means operative upon emergency landings of helicopters, and has for an object to so change the setting angle of the helicopter propeller blades when the motor fails or ceases to develop power, that the blades move into an angular position which is opposed to their operating or normal position, in order that the propeller by virtue of auto-rotation acts as a lift or sustaining screw for the purpose of braking the fall of the airplane and, thus, preventing disaster. It is supposed in this connection that said resetting of the helicopter blades will be effected so rapidly that the rotation of the screw will not be reduced below that number of revolutions which is necessary for sufficiently braking the fall of the airplane upon auto-rotation of the screw. Such arrangement necessitates an automatic instantaneous resetting of the helicopter blades at the given moment.

This invention is distinguished by the following features: the hub to which the helicopter blades are secured is rotatably mounted on the vertical motor drive shaft; the said hub is built as a clutch portion which is engaged by a second clutch portion provided on the said shaft; the two clutch portions interengage with play so that a relative rotation between hub and shaft is possible within limits; automatic control elements are provided which are so acted on by said relative rotation in both directions of rotation that the setting angle of the blades (which are rotatable about their longitudinal axes) is varied and reversed, so that when the motor is operating at full power the blade pitch is positive, or in the sense of rotation, and the screw thus operates as a lift screw; and spring means are provided which act on the vertical shaft and the hub and effects the relative rotation of the hub with respect to the said shaft in the respective sense of rotation when the motor either is not operating or with only with slight output, thus setting the negative blade pitch by means of the control elements, so that when the motor fails during flight, the propeller automatically is set at once for auto-rotation in order to act as a sustaining propeller with a view of retarding the fall of the airplane.

By virtue of the features set out above, the original sense of rotation of the helicopter propeller is maintained when the motor fails, whereby the unstable flight position of the helicopter otherwise arising on account of reversal of the direction of rotation of the propeller, is avoided. Since, on the other hand, in the position of rest of the propeller, the blades thereof are in an angular position opposed to the normal angular position, the helicopter on starting the motor under reduced fuel supply first is pushed against the ground through the rotating propeller and, thus, first correspondingly anchored so to speak, until owing to the increased motor power and rotary propeller speed as a result of an increased fuel supply, the correspondingly increased air resistance on the blades overcomes the counterforce fixing the negative blade angle and the blades are reset on the hub into their normal operative or angular position. As long as the blades are in their opposite angular position, their rotation produces an upward air current within the range of the blades, which current aids in lifting the helicopter off the ground.

Figure 2:
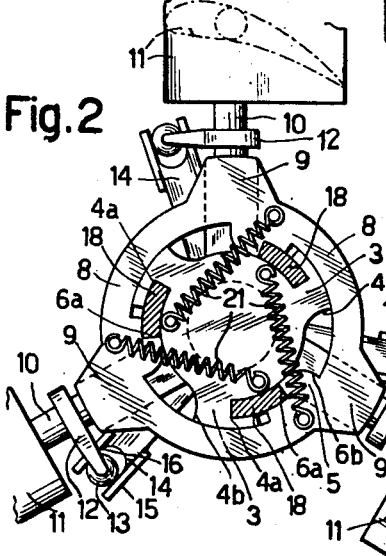
Figure 3:
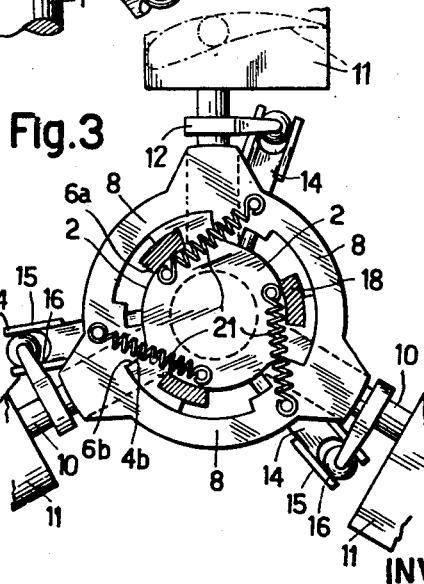

One form of this invention is illustrated by way of example in the accompanying drawing in which Fig. 1 is a perspective view of the emergency landing device, and Figs. 2 and 3 are both top plan views, wedge elements being shown in section.

The upright shaft 1 is connected to the engine (not shown) and at its head comprises a collar 2 provided with a plurality of circumferentially spaced jaws 3 which together form one clutch portion of which each has two abutment faces 4a and 4b. With the jaws 3 and the abutments 4a and 4b are associated counterjaws 5 provided with abutment faces 6a and 6b. The elements 3 and faces 6a and 6b are provided on the second clutch portion formed on the hub 7 which is rotatably mounted on shaft 1, by recesses in arc-shaped elements 8. The latter interconnect the three shaft bearings 9 which receive the shafts 10 of the blades 11. An adjusting arm 12 each is secured to the shafts 10 and has a spherical free end 13.

Three cantilevers 14 are fixed to shaft 1 by means of a central ring and terminate in a fork 15 each. Each arm 12 through its spherical end 13 is engaged between the plane legs 16 of one of the forks 15. A head disk 17 interconnecting three wedge elements 18, is disposed on top of shaft 1. The lower ends of said elements 18 are interconnected by means of a thrust bearing 19 mounted on shaft 1. Thus there is formed a set structure 17—19 which is movably guided axially on shaft 1 by means of an operating lever 20. The wedge elements 18 have tapered faces extending in the direction of shaft 1, and pass through recesses provided on the elements 8 interconnecting the shaft bearings 9 and on the jaws 3. The said recesses owing to their configuration form a second guide means for the said structure 17—19. Each wedge element 18 is disposed between two co-operating jaws 3 and 5 of the two clutch portions, and free space is left between said jaws so as to render possible a limited relative rotation between the two clutch portions. The angle of aperture of the space between the abutment faces 4a and 6a is determined by the wedge element 18 or the tapered face thereof and may be selected smaller or greater, within limits, by a corresponding movement or adjustment of the structure 17—19. The tension springs 21 which are secured at one end to the collar 2 of the head of shaft 1 and, at the other end, to that portion of hub 7 which is formed by the segments 8, tend to hold the two clutch portions in the sense of rotation in a relative position in which the faces 4b of the jaws 3 (Fig. 3) contact the abutment faces 6b presented thereto by the jaws 5. In this position (Fig. 3), the blades 11 occupy an angular position which is opposed to their normal operating position.

For the purpose of lifting the airplane from its base, the hub 7 by virtue of the increased air resistance on the blades is turned back relatively to shaft 1, as soon as the motor is producing the required torque on the shaft, until the abutment faces 6a of the second clutch portion contact the wedge elements 18 which are leading with respect to the abutment faces 4a of the first clutch portion (Fig. 2). The blades 11, thus, are automatically reset into their normal angular positions by way of the control elements 12—15. The degree of blade pitch is determined by the setting of the structure 17—19. By pulling the latter downwardly, which may be done at full engine speed, the wedge elements 18 force the jaws 3 and 5 at their abutment faces 4a and 6a apart, and the hub 7, thus, is made leading with respect to shaft 1 in the direction of rotation whereby the blade pitch is decreased by way of the control elements 12—15. When, on the other hand, the structure 17—19 is pushed upwardly by the operating lever 20, the blade pitch is increased, since through the air resistance on the blades 11, the hub 7 is still further turned back with respect to shaft 1.

When the engine fails or ceases to develop power from any reason, the torque on the first clutch portion disappears and, thus, also the effect of the air resistance on the blades in form of braking energy of the second clutch portion. In order that the non-operating engine does not hinder the shaft 1, the latter is equipped with a free-wheeling device (not shown in the drawing). As will be readily appreciated from the foregoing description, the springs 21, upon failure of the engine, cause the rotation of shaft 1 relatively to hub 7 until the abutment 4b and 6b contact each other so that the blades are automatically reset by means of the control elements 12—15 into the angular position opposed to the normal angular position, in which the propeller acts as the sustaining screw which is put to autorotation owing to the fall of the airplane. The negative blade pitch is determined by the arrangement of the abutment faces 4b and 6b and the deflection of the control elements 12—15 resulting therefrom and, thus, is independent of the accidental degree of the previous blade pitch. That negative blade pitch, which causes the maximum braking of the fall, of course, is predetermined.

The springs 21 have to be designed so that their tension, which holds together the abutment faces 4b and 6b and thus fixes the negative blade pitch, is not overcome by a slight braking energy which results on starting the engine under slight fuel supply prior to the start of the plane. The advantages of such arrangement have been set out in the first part of this description.

It is feasible to dispose wedge elements also between the abutment faces 4b and 6b of the jaws 3 and 5, which may be combined to form a separate set structure. Such arrangement affords various other advantages. For example, the propeller in the last phase of the emergency landing operation may be automatically reset to a positive pitch by a corresponding means with a view of obtaining immediately prior to landing an additional braking of the sinking speed of the helicopter by virtue of utilizing the momentum of the propeller.

What I claim as new and desire to secure by Letters Patent is:

1. In a helicopter, a drive shaft, a set of blades extending radially from said shaft at angularly spaced positions, said blades having shanks at their inner ends, a first clutch portion mounted on said shaft and provided with a set of bearings for the shanks of said blades, a second clutch portion mounted on said shaft in operative relation to the first clutch portion, both of said clutch portions having sets of inter-engageable surfaces facing respectively in both directions of drive, said surfaces of one set being spaced apart in one direction when the other set is in driving engagement, so that the clutch portions are relatively turnable to a limited extent about the drive shaft, axial wedge-shaped elements located in the spaces between the engageable surfaces of the clutch portions, for gradually positioning the blade shanks, a blade setting mechanism mounted axially slidably on the drive shaft and connected with said wedge-shaped elements and comprising an operating lever and control devices connected with the blade shanks to turn said shanks and their blades about their individual longitudinal axes to change their angles when the operating lever is actuated, and springs connected between said clutch portions to be put under stress upon relative turning of the clutch portions, for returning clutch portions and blades to the opposite position.

2. Apparatus according to claim 1 and in which the engageable surfaces of the clutch portions are provided with recesses for accommodating the wedge-shaped elements.

3. Apparatus according to claim 2 and in which the bearings of the blade shanks are interconnected by segments having cut-outs therein which provide the engageable surfaces of the first clutch portion.

4. Apparatus according to claim 1 and in which radially extending cantilevers are rigidly mounted on the drive shaft and are provided with forked outer ends, and control levers mounted on the blade shanks and having ball-shaped ends located in the respective forked ends.

ADOLF MUTHER.

References Cited in the file of this patent

UNITED STATES PATENTS

| Number | Name | Date |
|---|---|---|
| 2,504,737 | Sharpes | Apr. 18, 1950 |

FOREIGN PATENTS

| Number | Country | Date |
|---|---|---|
| 851,766 | France | Oct. 9, 1939 |